(12) United States Patent
Nakata et al.

(10) Patent No.: US 11,863,043 B2
(45) Date of Patent: Jan. 2, 2024

(54) ROTARY ELECTRIC MACHINE AND DRIVE DEVICE

(71) Applicant: NIDEC CORPORATION, Kyoto (JP)

(72) Inventors: Keisuke Nakata, Kyoto (JP); Yuki Ishikawa, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 109 days.

(21) Appl. No.: 17/686,407

(22) Filed: Mar. 4, 2022

(65) Prior Publication Data

US 2022/0286012 A1 Sep. 8, 2022

(30) Foreign Application Priority Data

Mar. 8, 2021 (JP) ................. 2021-036632

(51) Int. Cl.
*H02K 5/173* (2006.01)
*H02K 11/33* (2016.01)
*H02K 9/19* (2006.01)
*H02K 7/116* (2006.01)
*H01R 39/12* (2006.01)

(52) U.S. Cl.
CPC ............ *H02K 5/173* (2013.01); *H01R 39/12* (2013.01); *H02K 7/116* (2013.01); *H02K 9/19* (2013.01); *H02K 11/33* (2016.01)

(58) Field of Classification Search
CPC .......... H02K 5/173; H02K 7/116; H02K 9/19; H02K 11/33; H02K 1/32; H02K 5/203; H02K 7/003; H02K 11/40; H02K 5/165; H01R 39/12
USPC .......................................................... 310/90
See application file for complete search history.

(56) References Cited

U.S. PATENT DOCUMENTS

| 10,069,382 | B2* | 9/2018 | Sturm ................... H02K 11/40 |
| 11,022,112 | B2* | 6/2021 | Yamaguchi ............. H02K 9/19 |
| 2008/0088187 | A1* | 4/2008 | Shao ................... H02K 11/0141 310/90 |
| 2009/0015083 | A1* | 1/2009 | Hsieh ..................... H02K 11/40 310/90 |
| 2010/0187946 | A1* | 7/2010 | Orlowski ............... H02K 11/40 310/232 |

(Continued)

FOREIGN PATENT DOCUMENTS

| JP | 2595004 | * | 2/1993 |
| JP | 2006223010 A | | 8/2006 |

(Continued)

*Primary Examiner* — Ahmed Elnakib
(74) *Attorney, Agent, or Firm* — HAUPTMAN HAM, LLP

(57) ABSTRACT

A rotary electric machine includes a rotor having a hollow shaft, a housing, a current shunter fixed to the housing and in electrical contact with the shaft and the housing, and a nozzle member for feeding a fluid inside the shaft. The shaft has an open end portion on a first axial side. The housing includes a bottom wall on the first axial side from the open end portion, and a peripheral wall protruding from the bottom wall toward a second axial side and surrounding the open end portion. The nozzle member has a feeding tubular part at least partly inserted inside the shaft from the open end portion, and a flange portion protruding radially outward from the feeding tubular part. The current shunter is located radially inside the peripheral wall, and the flange portion is located between the current shunter and the bottom wall in an axial direction.

20 Claims, 5 Drawing Sheets

(56) References Cited

U.S. PATENT DOCUMENTS

| | | | |
|---|---|---|---|
| 2011/0193446 A1 | 8/2011 | Orlowski et al. | |
| 2011/0204734 A1* | 8/2011 | Orlowski .................. | H02K 5/10 |
| | | | 310/85 |
| 2022/0286011 A1* | 9/2022 | Nakata .................... | H02K 5/161 |
| 2022/0286012 A1* | 9/2022 | Nakata .................... | H02K 11/33 |
| 2022/0286025 A1* | 9/2022 | Kuroyanagi ............. | H02K 9/19 |
| 2022/0393546 A1* | 12/2022 | Makino .................. | H02K 7/116 |
| 2023/0006498 A1* | 1/2023 | Makino .................. | H02K 11/40 |
| 2023/0006500 A1* | 1/2023 | Shimogai ................. | H02K 9/19 |
| 2023/0006507 A1* | 1/2023 | Nakamura ............... | H02K 5/16 |
| 2023/0007761 A1* | 1/2023 | Shiraishi .................. | H05F 3/02 |
| 2023/0008514 A1* | 1/2023 | Durocher ................. | F02K 3/02 |
| 2023/0132520 A1* | 5/2023 | Nakata .................... | H02K 5/20 |
| | | | 310/90 |
| 2023/0137134 A1* | 5/2023 | Nakata .................... | H02K 5/14 |
| | | | 310/90 |
| 2023/0231435 A1* | 7/2023 | Abdul ..................... | F16C 35/06 |
| | | | 310/66 |

FOREIGN PATENT DOCUMENTS

| | | | |
|---|---|---|---|
| JP | 2020143689 A | | 9/2020 |
| KR | 20040033980 | * | 4/2004 |
| WO | WO 2023094193 | * | 11/2021 |

* cited by examiner

ROTARY ELECTRIC MACHINE AND DRIVE DEVICE

CROSS-REFERENCE TO RELATED APPLICATIONS

The present invention claims priority under 35 U.S.C. § 119 to Japanese Patent Application No. 2021-036632 filed on Mar. 8, 2021, the entire content of which is incorporated herein by reference.

FIELD OF THE INVENTION

The present invention relates to a rotary electric machine and a drive device.

BACKGROUND

There is known a charge dissipating device that dissipates charges from a shaft of a rotary electric machine. For example, conventionally a current shunt ring having a conductive segment in contact with the shaft is known.

A rotary electric machine provided with a charge dissipating device as described above may be provided with a nozzle member for feeding a fluid in a hollow shaft for the purpose of cooling, for example. Such a rotary electric machine requires a fixing member for fixing the charge dissipating device and the nozzle member, and thus causing a problem of increase in number of parts of the rotary electric machine.

SUMMARY

A rotary electric machine according to an aspect of the present invention includes a rotor having a shaft in a hollow shape rotatable about a central axis, a stator facing the rotor across a gap, a housing for accommodating the rotor and the stator inside, a bearing that rotatably supports the rotor, a current shunter that is fixed to the housing and is in electrical contact with the shaft and the housing, and a nozzle member that feeds a fluid into inside the shaft. The shaft has an open end portion that opens on a first axial side. The housing includes a bottom wall located on the first axial side from the open end portion, and a peripheral wall protruding from the bottom wall toward a second axial side and surrounding the open end portion. The nozzle member has a feeding tubular part that is at least partly inserted into inside the shaft from the open end portion, and a flange portion that protrudes radially outward from the feeding tubular part. The current shunter is located radially inside the peripheral wall. The flange portion is located between the current shunter and the bottom wall in an axial direction.

A drive device according to an aspect of the present invention is mounted on a vehicle, and includes the rotary electric machine described above, and a transmission device that is connected to the rotary electric machine and transmits rotation of the rotary electric machine to an axle of the vehicle.

The above and other elements, features, steps, characteristics and advantages of the present disclosure will become more apparent from the following detailed description of the preferred embodiments with reference to the attached drawings.

DETAILED DESCRIPTION

Figure 1:
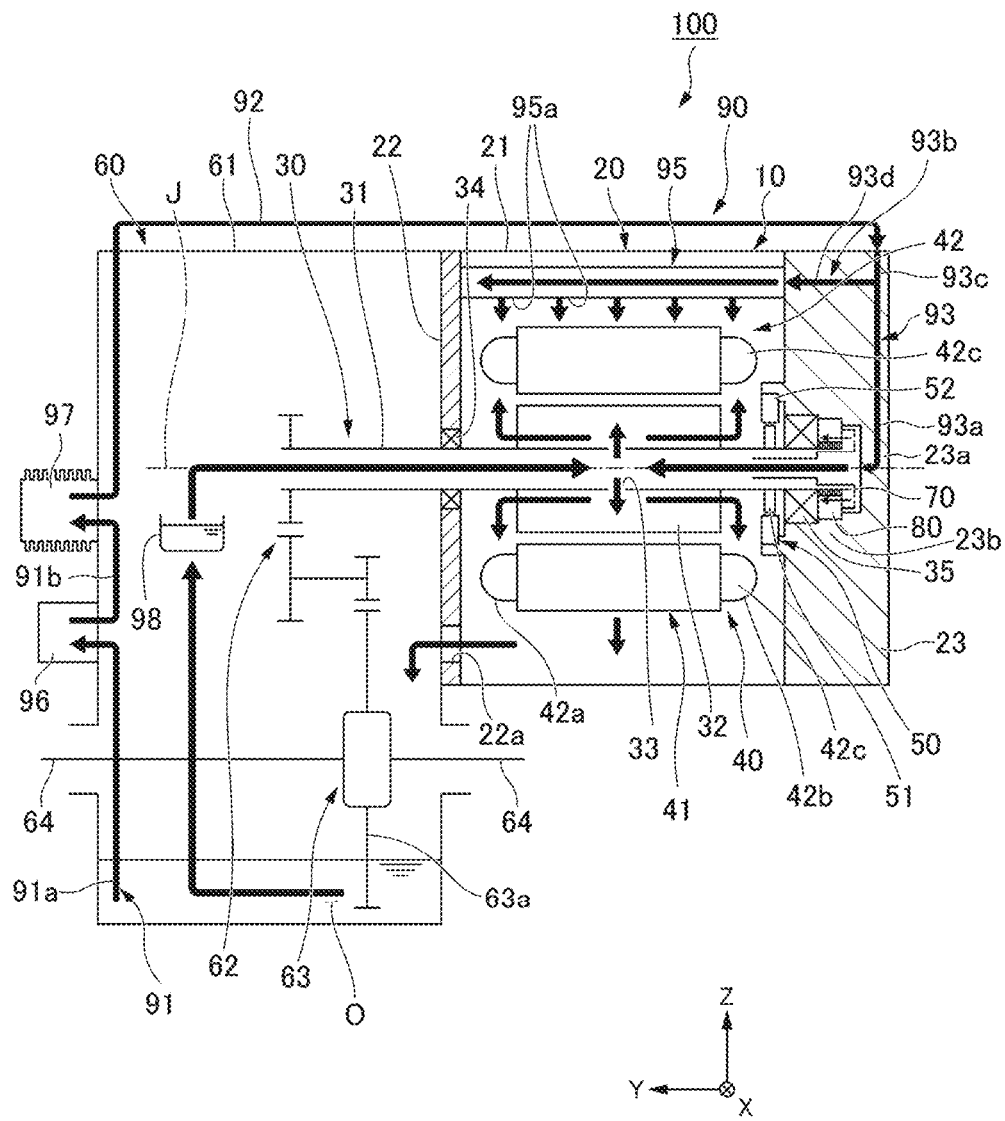
FIG. 1 is a schematic structural view schematically illustrating a drive device according to a first embodiment.

In the following description, a vertical direction is defined and described based on a positional relationship when a drive device according to an embodiment is mounted on a vehicle positioned on a horizontal road surface. That is, a relative positional relationship with respect to the vertical direction described in the following embodiments needs to be satisfied at least when the drive device is mounted on a vehicle positioned on a horizontal road surface.

In the drawings, an xyz coordinate system is shown appropriately as a three-dimensional orthogonal coordinate system. In the XYZ coordinate system, a Z-axis direction corresponds to the vertical direction. An arrow in the Z-axis is directed toward a side (+Z side) that is an upper side in the vertical direction, and a side (−Z side) opposite to the side toward which the arrow in the Z-axis is directed is a lower side in the vertical direction. In the following description, the upper side and the lower side in the vertical direction will be referred to simply as the "upper side" and the "lower side", respectively. An X-axis direction is orthogonal to the Z-axis direction and corresponds to a front-rear direction of the vehicle on which the drive device is mounted. In the following embodiments, a side (+X side) toward which an arrow in the X-axis is directed is a front side in the vehicle, and a side (−X side) opposite to the side toward which the arrow in the X-axis is directed is a rear side in the vehicle. A Y-axis direction is orthogonal to both the X-axis direction and the Z-axis direction and corresponds to a left-right direction of the vehicle, i.e., a vehicle lateral direction. In the following embodiments, a side (+Y side) toward which an arrow in the Y-axis is directed is a left side in the vehicle, and a side (−Y side) opposite to the side toward which the arrow in the Y-axis is directed is a right side in the vehicle. The front-rear direction and the left-right direction are each a horizontal direction orthogonal to the vertical direction.

A positional relationship in the front-rear direction is not limited to the positional relationship of the following embodiments. The side (+X side) toward which the arrow in the X-axis is directed may be the rear side in the vehicle, and the side (−X side) opposite to the side toward which the arrow in the X-axis is directed may be the front side in the vehicle. In this case, the side (+Y side) toward which the arrow in the Y-axis is directed is the right side in the vehicle, and the side (−Y side) opposite to the side toward which the arrow in the Y-axis is directed is the left side in the vehicle. In the present specification, a "parallel direction" includes a substantially parallel direction, and an "orthogonal direction" includes a substantially orthogonal direction.

A central axis J illustrated in the drawings as appropriate is a virtual axis extending in a direction intersecting the vertical direction. More specifically, the central axis J extends in the Y-axis direction orthogonal to the vertical direction, i.e., in the left-right direction of the vehicle. In description below, unless otherwise particularly stated, a direction parallel to the central axis J is simply referred to as the "axial direction", a radial direction about the central axis J is simply referred to as the "radial direction", and a circumferential direction about the central axis J, i.e., a direction around the central axis J is simply referred to as the "circumferential direction". In the following embodiments, the right side (−Y side) is referred to as a "first axial side", and the left side (+Y side) is referred to as a "second axial side".

FIG. 1 illustrates a drive device 100 of the present embodiment that is mounted on a vehicle and rotates an axle 64. The vehicle on which the drive device 100 is mounted is a vehicle including a motor as a power source, such as a hybrid vehicle (HEV), a plug-in hybrid vehicle (PHV), or an electric vehicle (EV). As illustrated in FIG. 1, the drive device 100 includes a rotary electric machine 10 and a transmission device 60. The transmission device 60 is connected to the rotary electric machine 10, and transmits rotation of the rotary electric machine 10, i.e., rotation of a rotor 30 described later, to the axle 64 of the vehicle. The transmission device 60 of the present embodiment includes a gear housing 61, a speed reducer 62 connected to the rotary electric machine 10, and a differential gear 63 connected to the speed reducer 62.

The gear housing 61 internally accommodates the speed reducer 62, the differential gear 63, and oil O. The oil O is stored in a lower region in the gear housing 61. The oil O circulates in a refrigerant flow path 90 described later. The oil O is used as a refrigerant for cooling the rotary electric machine 10. The oil O is also used as lubricating oil for the speed reducer 62 and the differential gear 63. As the oil O, for example, an oil equivalent to an automatic transmission fluid (ATF) having a relatively low viscosity is preferably used to function as a refrigerant and a lubricating oil.

The differential gear 63 includes a ring gear 63a. The ring gear 63a receives torque output from the rotary electric machine 10 and transmitted through the speed reducer 62. The ring gear 63a has a lower end portion immersed in the oil O stored in the gear housing 61. When the ring gear 63a rotates, the oil O is scraped up. The oil O scraped up is supplied to, for example, the speed reducer 62 and the differential gear 63 as a lubricating oil.

The rotary electric machine 10 drives the drive device 100. The rotary electric machine 10 is located, for example, on the first axial side (−Y side) from the transmission device 60. In the present embodiment, the rotary electric machine 10 is a motor. The rotary electric machine 10 includes a motor housing 20, a rotor 30 having a shaft 31, bearings 34 and 35 that rotatably support the rotor 30, a stator 40, a resolver 50, a nozzle member 70, and a current shunter 80. The bearings 34 and 35 are each a ball bearing, for example.

The motor housing 20 internally accommodates the rotor 30 and the stator 40. The motor housing 20 is connected to the gear housing 61 on the first axial side (−Y side). The motor housing 20 has a body 21, a partition wall 22, and a lid 23. The body 21 and the partition wall 22 are each, for example, a part of a single member. The lid 23 is separate from, for example, the body 21 and the partition wall 22.

The body 21 is in a cylindrical shape that surrounds the central axis J and opens toward the first axial side (−Y side). The partition wall 22 is connected to an end portion of the body 21 on the second axial side (+Y side). The partition wall 22 axially partitions the inside of the motor housing 20 and the inside of the gear housing 61. The partition wall 22 has a partition wall opening 22a that allows the inside of the motor housing 20 to communicate with the inside of the gear housing 61. The partition wall 22 holds a bearing 34. The lid 23 is fixed to an end portion of the body 21 on the first axial side. The lid 23 closes an opening of the body 21 on the first axial side. The lid 23 holds the bearing 35.

Figure 2:
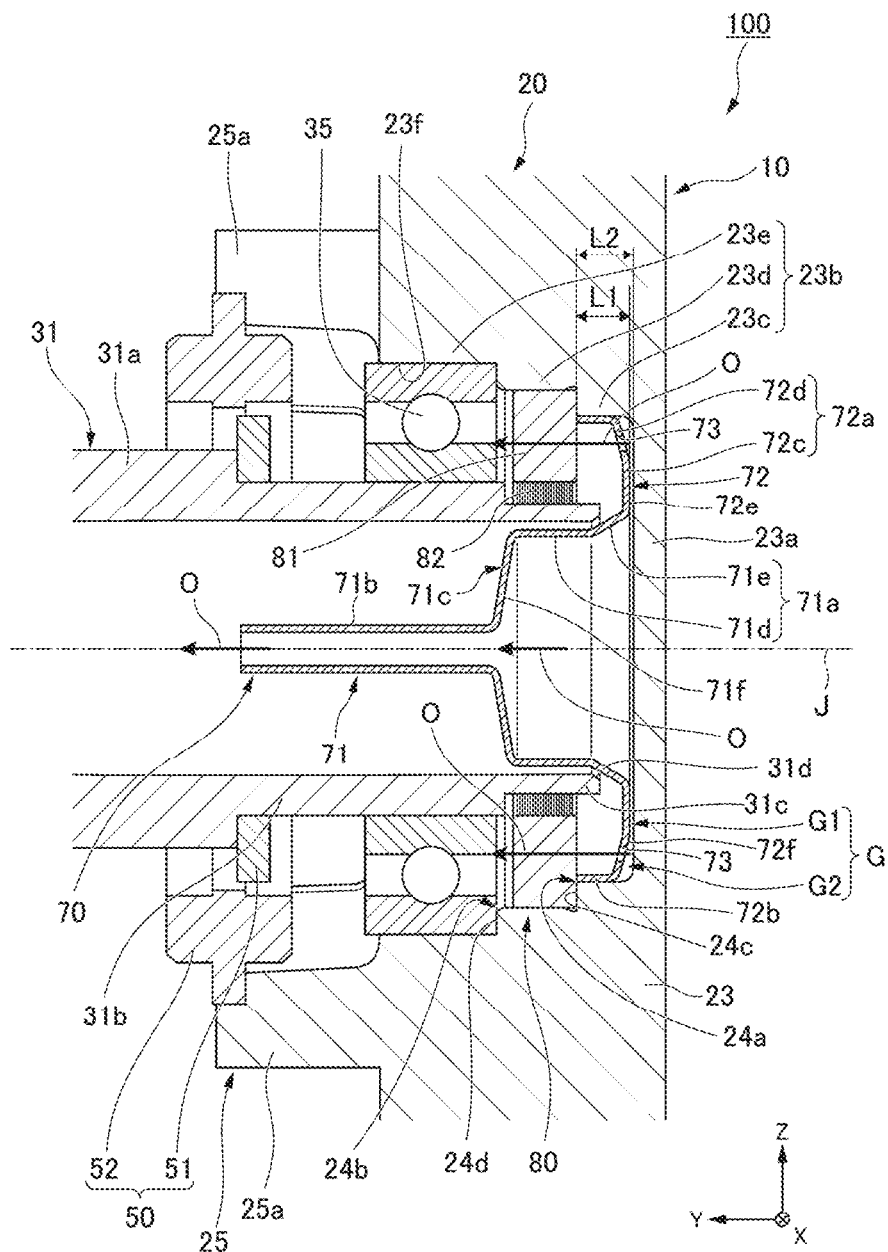
FIG. 2 is a sectional view illustrating a part of a rotary electric machine of the first embodiment.

As illustrated in FIG. 2, the lid 23 has a hole 23f recessed from its surface on the second axial side (+Y side) toward the first axial side (−Y side). The hole 23f has a bottom on the first axial side and opens toward the second axial side. In the present embodiment, the hole 23f is a circular hole about the central axis J. Providing the hole 23f provides a bottom wall 23a and a peripheral wall 23b to the lid 23. That is, the motor housing 20 includes the bottom wall 23a and the peripheral wall 23b.

The bottom wall 23a is the bottom of the hole 23f. The bottom wall 23a is located on the first axial side (−Y side) from an open end portion 31d of the shaft 31. The peripheral wall 23b protrudes from a radially outer peripheral edge of the bottom wall 23a toward the second axial side (+Y side). The peripheral wall 23b surrounds the open end portion 31d of the shaft 31. The peripheral wall 23b has an inner peripheral surface that is an inner peripheral surface of the hole 23f. In the present embodiment, the inner peripheral surface of the peripheral wall 23b has a cylindrical shape about the central axis J.

The peripheral wall 23b includes a first wall portion 23c, a second wall portion 23d, and a third wall portion 23e. The first wall portion 23c is connected to a radially outer peripheral edge of the bottom wall 23a. The second wall portion 23d is connected to the first wall portion 23c on the second axial side (+Y side). The second wall portion 23d has a larger inner diameter than the first wall portion 23c. The second wall portion 23d has a larger axial dimension than the first wall portion 23c. The third wall portion 23e is connected to the second wall portion 23d on the second axial side. The third wall portion 23e has a larger inner diameter than the second wall portion 23d. The third wall portion 23e has a larger axial dimension than the second wall portion 23d. Radially inside the third wall portion 23e, the bearing 35 is held. The bearing 35 includes an outer ring fitted into the third wall portion 23e radially inward.

In the present embodiment, the inner peripheral surface of the peripheral wall 23b has a first stepped portion 24a and a second stepped portion 24b. The first stepped portion 24a is provided axially between an inner peripheral surface of the first wall portion 23c and an inner peripheral surface of the second wall portion 23d. The first stepped portion 24a has a first shoulder surface 24c facing the second axial side (+Y side). The first shoulder surface 24c is in an annular shape about the central axis J. The first shoulder surface 24c is a flat surface orthogonal to the axial direction. The second stepped portion 24b is provided axially between the inner peripheral surface of the second wall portion 23d and an inner peripheral surface of the third wall portion 23e. The second stepped portion 24b has a second shoulder surface 24d facing the second axial side. The second shoulder surface 24d is in an annular shape about the central axis J. The second shoulder surface 24d is a flat surface orthogonal to the axial direction. The bearing 35 held in the third wall portion 23e is in contact with the second shoulder surface 24d. Thus, the bearing 35 can be suitably positioned in the axial direction with respect to the motor housing 20. More specifically, the outer ring of the bearing 35 is in contact with the second shoulder surface 24d from the second axial side.

The lid 23 has a surface on the second axial side (+Y side) that is provided with a resolver holding portion 25. In the present embodiment, the resolver holding portion 25 is composed of a plurality of protruding wall portions 25a protruding toward the second axial side. The plurality of protruding wall portions 25a is provided on a peripheral edge portion around the hole 23f in a surface of the lid 23 on the second axial side. The plurality of protruding wall portions 25a is disposed surrounding the shaft 31.

As illustrated in FIG. 1, the rotor 30 includes the shaft 31 and a rotor body 32. Although not illustrated, the rotor body 32 includes a rotor core, and a rotor magnet fixed to the rotor core. Torque of the rotor 30 is transmitted to the transmission device 60.

The shaft 31 is rotatable about the central axis J. The shaft 31 is rotatably supported by the bearings 34 and 35. The shaft 31 is a hollow shaft. The shaft 31 has a cylindrical shape about the central axis J and extends axially. The shaft 31 is provided with a hole 33 that allows the inside of the shaft 31 to communicate with the outside of the shaft 31. The shaft 31 extends across the inside of the motor housing 20 and the inside of the gear housing 61. The shaft 31 has an end portion on the second axial side (+Y side) that protrudes into the inside of the gear housing 61. The shaft 31 is connected at the end portion on the second axial side to the speed reducer 62.

The shaft 31 is open on both sides in the axial direction. As illustrated in FIG. 2, the shaft 31 has the open end portion 31d that opens on the first axial side (−Y side). The shaft 31 includes a first shaft portion 31a, a second shaft portion 31b, and a third shaft portion 31c. The second shaft portion 31b is connected to the first shaft portion 31a on the first axial side. The second shaft portion 31b has a smaller outer diameter than the first shaft portion 31a. The third shaft portion 31c is connected to the second shaft portion 31b on the first axial side. The third shaft portion 31c has a smaller outer diameter than the second shaft portion 31b. The third shaft portion 31c has a smaller axial dimension than the second shaft portion 31b. The third shaft portion 31c has an end portion on the first axial side that is an end portion of the shaft 31 on the first axial side, and that is the open end portion 31d.

The first shaft portion 31a, the second shaft portion 31b, and the third shaft portion 31c are equal in inner diameter to each other. Between an outer peripheral surface of the first shaft portion 31a and an outer peripheral surface of the second shaft portion 31b, a stepped portion having a shoulder surface facing the first axial side (−Y side) is provided. Between the outer peripheral surface of the second shaft portion 31b and an outer peripheral surface of the third shaft portion 31c, a stepped portion having a shoulder surface facing the first axial side (−Y side) is provided.

A portion of the second shaft portion 31b on the first axial side (−Y side) and the third shaft portion 31c are located radially inside the peripheral wall 23b. More specifically, the portion of the second shaft portion 31b on the first axial side (−Y side) is located radially inside the third wall portion 23e. The third shaft portion 31c is located radially inside the second wall portion 23d and the first wall portion 23c. In the present embodiment, the open end portion 31d is located radially inside the first wall portion 23c. The outer peripheral surface of the second shaft portion 31b and the outer peripheral surface of the third shaft portion 31c are disposed away from the inner peripheral surface of the peripheral wall 23b in a radially inward direction. The open end portion 31d is disposed on the second axial side (+Y side) away from the bottom wall 23a.

As illustrated in FIG. 1, the stator 40 faces the rotor 30 across a gap in the radial direction. More specifically, the stator 40 is located radially outward of the rotor 30. The stator 40 is fixed inside the motor housing 20. The stator 40 includes the stator core 41 and a coil assembly 42.

The stator core 41 is in an annular shape surrounding the central axis J of the rotary electric machine 10. The stator core 41 is located radially outside the rotor 30. The stator core 41 surrounds the rotor 30. The stator core 41 is composed of, for example, plate members such as electromagnetic steel plates stacked in the axial direction. Although not illustrated, the stator core 41 includes a core back in a cylindrical shape extending in the axial direction, and a plurality of teeth extending to an inner side from the core back in the radial direction.

The coil assembly 42 includes multiple coils 42c attached to the stator core 41 along the circumferential direction. The multiple coils 42c are mounted on the respective teeth of the stator core 41 with respective insulators (not illustrated) interposed therebetween. The coil assembly 42 includes coil ends 42a and 42b that protrude axially from the stator core 41.

The resolver 50 can detect rotation of the rotor 30. The resolver 50 is accommodated inside the motor housing 20. The resolver 50 includes a resolver rotor 51 and a resolver stator 52. The resolver rotor 51 is fixed to the shaft 31. The resolver rotor 51 is in an annular shape surrounding the shaft 31. In the present embodiment, the resolver rotor 51 is in an annular shape about the central axis J. As illustrated in FIG. 2, the resolver rotor 51 surrounds an end portion of the second shaft portion 31b on the second axial side (+Y side) in the present embodiment. The resolver rotor 51 is in a plate shape in which a plate surface faces the axial direction. The resolver rotor 51 has a surface on the second axial side that is in contact with the shoulder surface of the stepped portion provided between the first shaft portion 31a and the second shaft portion 31b in the axial direction. The resolver rotor 51 protrudes radially outward from the outer peripheral surface of the first shaft portion 31a. The resolver rotor 51 is disposed on the second axial side apart from the bearing 35.

The resolver stator 52 is located radially outside the resolver rotor 51. The resolver stator 52 is in an annular shape surrounding the resolver rotor 51. The resolver stator 52 is held by the resolver holding portion 25. Although not illustrated, the resolver stator 52 includes a coil. When the resolver rotor 51 rotates together with the shaft 31, induced voltage corresponding to a circumferential position of the resolver rotor 51 is generated in the coil of the resolver stator 52. The resolver 50 can detect rotation of the resolver rotor 51 and the shaft 31 based on change in the induced voltage generated in the coil of the resolver stator 52. This enables the resolver 50 to detect rotation of the rotor 30.

The current shunter 80 is located radially inside the peripheral wall 23b. The current shunter 80 is in an annular shape surrounding the shaft 31. In the present embodiment, the current shunter 80 is in an annular shape about the central axis J. The current shunter 80 surrounds the third shaft portion 31c. In the present embodiment, the current shunter 80 is fitted inside the second wall portion 23d in the radial direction. The current shunter 80 is located on the second axial side (+Y side) from the open end portion 31d. That is, the open end portion 31d is located on the first axial side (−Y side) from the current shunter 80.

Figure 3:
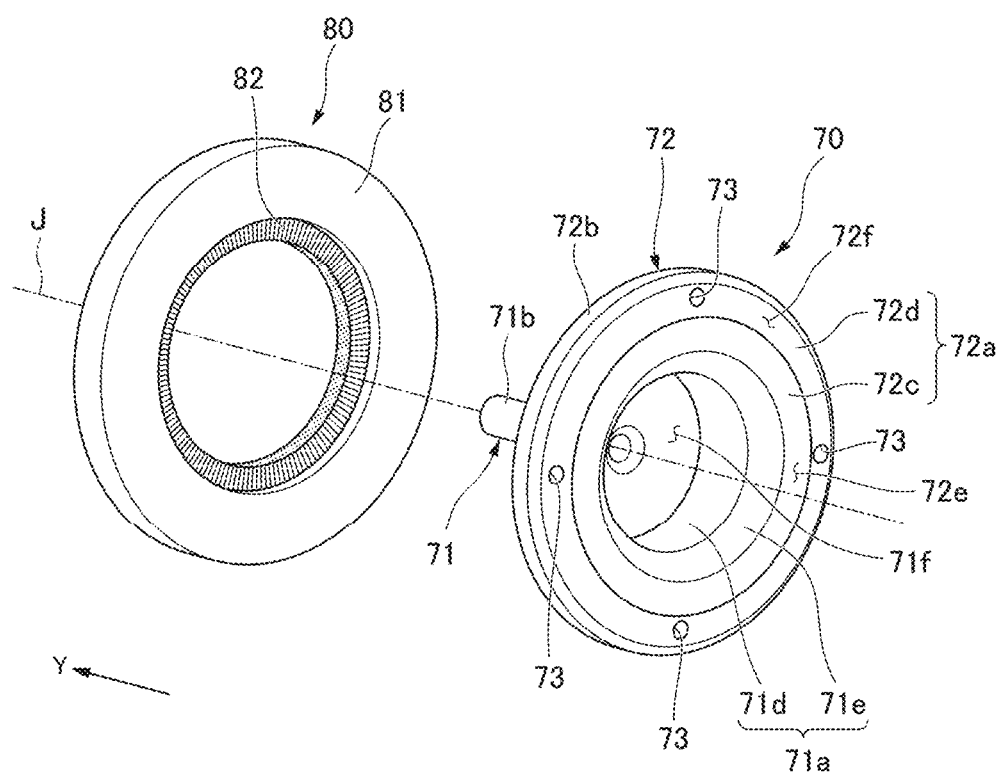
FIG. 3 is an exploded perspective view illustrating a current shunter and a nozzle member of the first embodiment.

The current shunter 80 is located on the first axial side (−Y side) from the bearing 35. This allows the bearing 35 to be located between the resolver rotor 51 and the current shunter 80 in the axial direction. In the present embodiment, the current shunter 80 faces the bearing 35 across a gap. An axial distance between the current shunter 80 and the bearing 35 is smaller than an axial distance between the bearing 35 and the resolver rotor 51. As illustrated in FIG. 3, the current shunter 80 includes a base 81 in an annular shape about the central axis J, and a brush 82 provided on a radially inner edge of the base 81 over the entire circumference.

As illustrated in FIG. 2, the base 81 is fitted inside the second wall portion 23*d* in the radial direction. The base 81 is fixed to the second wall portion 23*d* with, for example, an adhesive. As a result, the current shunter 80 is fixed to the motor housing 20. A method for fixing the current shunter 80 to the motor housing 20 is not particularly limited. The current shunter 80 may be fixed to the motor housing 20 by press fitting, for example.

The base 81 has a surface on the first axial side (−Y side) in which a radially outer edge portion is in contact with the first shoulder surface 24*c*. As a result, the current shunter 80 is in contact with the first shoulder surface 24*c*. Thus, the current shunter 80 can be suitably positioned in the axial direction with respect to the motor housing 20. The base 81 is in electrical contact with the peripheral wall 23*b*. As a result, the current shunter 80 is in electrical contact with the motor housing 20. In the present specification, the text, "an object is in electrical contact with another object", means that an electric current can flow between the object and the other object.

The brush 82 is in an annular shape surrounding the shaft 31. More specifically, the brush 82 is in an annular shape about the central axis J to surround the third shaft portion 31*c*. In the present embodiment, the brush 82 is composed of a plurality of conductive fibers protruding radially inward from the radially inner edge of the base 81. The fibers constituting the brush 82 are, for example, microfibers. The brush 82 is electrically connected to the base 81. The brush 82 has a radially inner edge in electrical contact with the outer peripheral surface of the third shaft portion 31*c*. As a result, the current shunter 80 is in electrical contact with the shaft 31. In the present embodiment, the shaft 31 rotates with the third shaft portion 31*c* having the outer peripheral surface that is rubbed against the radially inner edge of the brush 82.

In this way, the shaft 31 and the motor housing 20 are electrically connected through the current shunter 80. This enables a current generated in the shaft 31 to flow from the peripheral wall 23*b* to the motor housing 20 through the brush 82 and the base 81 in this order. As a result, the current can be prevented from flowing from the shaft 31 to the bearings 34 and 35 that rotatably support the shaft 31. Thus, electrolytic corrosion can be prevented from occurring in the bearings 34 and 35.

In the present embodiment, the current shunter 80 is excellent in oil resistance. That is, the current shunter 80 is unlikely to undergo change due to contact with the oil O. It is conceivable that the oil resistance is evaluated by an immersion test in the oil O. In this case, the oil resistance is evaluated by change in weight and change in strength after immersion for a predetermined time. The evaluation of change in weight includes, for example, evaluation in terms of corrosion and swelling.

The nozzle member 10 is used for feeding the oil O as a fluid into the inside of the shaft 31. The nozzle member 70 is formed by performing machining, such as press working, on a plate member made of metal, for example. The nozzle member 70 is disposed inside the peripheral wall 23*b*. The nozzle member 70 includes a feeding tubular part 71 and a flange portion 72.

The feeding tubular part 71 extends in the axial direction. In the present embodiment, the feeding tubular part 71 is in a cylindrical shape about the central axis J. The feeding tubular part 71 is open on both sides in the axial direction.

Figure 4:
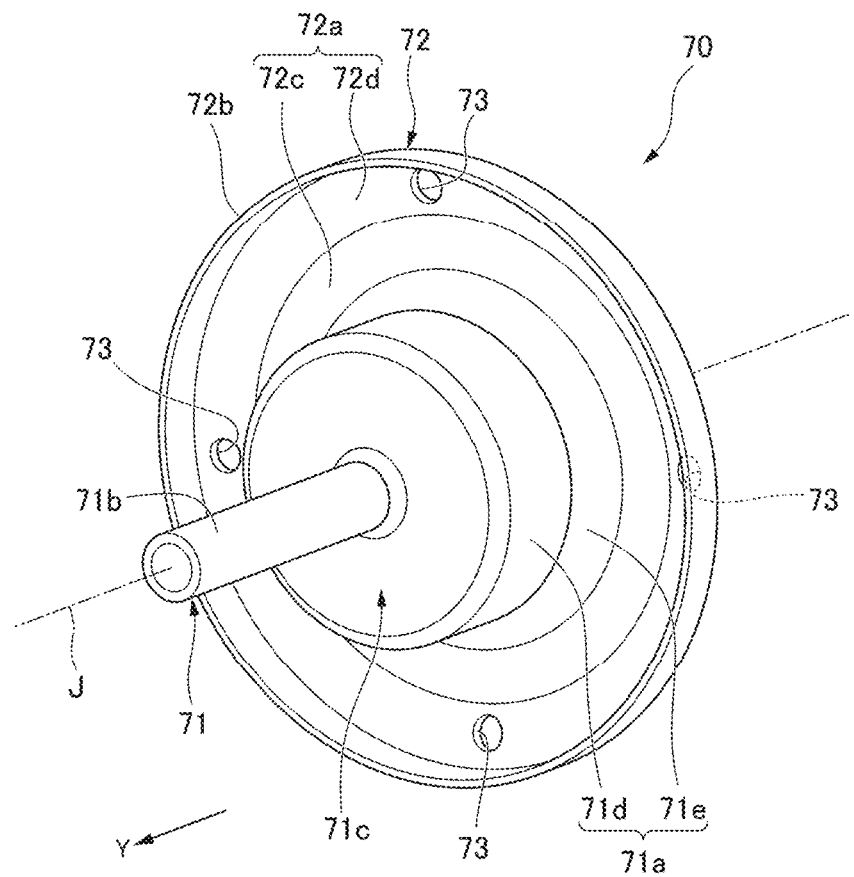
FIG. 4 is a perspective view illustrating the nozzle member of the first embodiment.

At least a part of the feeding tubular part 71 is inserted into inside the shaft 31 from the open end portion 31*d*. In the present embodiment, the entire feeding tubular part 71 except for its end portion on the first axial side (−Y side) is inserted into inside the shaft 31. The end portion of the feeding tubular part 71 on the first axial side is located on the first axial side from the shaft 31. In the present embodiment, the feeding tubular part 71 has an outer peripheral surface disposed away from an inner peripheral surface of the shaft 31 in the radially inward direction. This enables preventing the feeding tubular part 71 from rubbing against the shaft 31. As a result, the feeding tubular part 71 can be prevented from being worn. The feeding tubular part 71 includes a large diameter portion 71*a*, a small diameter portion 71*b*, and a connection portion 71*c*. As illustrated in FIGS. 2 to 4, the feeding tubular part 71 is formed in a funnel shape in the present embodiment by the large diameter portion 71*a*, the small diameter portion 71*b*, and the connection portion 71*c*.

As illustrated in FIG. 2, the large diameter portion 71*a* is located on the first axial side (−Y side) in the feeding tubular part 71. The large diameter portion 71*a* has an end portion on the first axial side that is an end portion of the feeding tubular part 71 on the first axial side. The large diameter portion 71*a* includes an inserted portion 71*d* inserted into the shaft 31 and an enlarged diameter portion 71*e* connected to the inserted portion 71*d* on the first axial side. In the present embodiment, the inserted portion 71*d* is located radially inside the third shaft portion 31*c*. The inserted portion 71*d* has an outer peripheral surface disposed away from an inner peripheral surface of the third shaft portion 31*c* in the radially inward direction. The inserted portion 71*d* has inner and outer diameters that are each uniform throughout the axial direction. The enlarged diameter portion 71*e* has inner and outer diameters that each increase toward the first axial side from the inserted portion 71*d*. As a result, the end portion of the feeding tubular part 71 on the first axial side in the present embodiment has an inner diameter increasing toward the first axial side.

The enlarged diameter portion 71*e* has an inner peripheral surface that is a tapered surface with an inner diameter decreasing linearly toward the second axial side (+Y side). The enlarged diameter portion 71*e* has an outer peripheral surface that is a tapered surface with an outer diameter decreasing linearly toward the second axial side. In the present embodiment, the enlarged diameter portion 71*e* has an end portion on the first axial side (−Y side) that is located radially outside an inner peripheral surface of the open end portion 31*d* and that is located radially inside an outer peripheral surface of the open end portion 31*d*. The end portion of the enlarged diameter portion 71*e* on the first axial side is located on the first axial side away from the open end portion 31*d*. The enlarged diameter portion 71*e* has a smaller axial dimension than the inserted portion 71*d*.

The small diameter portion 71*b* is located on the second axial side (+Y side) in the feeding tubular part 71. The small diameter portion 71*b* is connected to the large diameter portion 71*a* on the second axial side. In the present embodiment, the small diameter portion 71*b* is connected to the large diameter portion 71*a* with the connection portion 71*c*. The small diameter portion 71*b* has an end portion on the second axial side that is an end portion of the feeding tubular part 71 on the second axial side. The small diameter portion 71*b* has a smaller inner diameter than the large diameter portion 71*a*. The inner diameter of the small diameter portion 71*b* is, for example, half or less of the inner diameter of the large diameter portion 71*a*. The small diameter portion 71*b* has a smaller outer diameter than the large diameter portion 71a. The outer diameter of the small diameter portion 71b is, for example, half or less of the outer diameter of the large diameter portion 71a. The small diameter portion 71b has a larger axial dimension than the large diameter portion 71a.

The entire small diameter portion 71b is inserted into inside the shaft 31. In the present embodiment, the small diameter portion 71b is located radially inside the second shaft portion 31b. The small diameter portion 71b has an outer peripheral surface disposed away from the inner peripheral surface of the second shaft portion 31b in the radially inward direction. A radial distance between the outer peripheral surface of the small diameter portion 71b and the inner peripheral surface of the shaft 31 is larger than a radial distance between an outer peripheral surface of the large diameter portion 71a and the inner peripheral surface of the shaft 31. In the present embodiment, the end portion of the small diameter portion 71b on the second axial side (+Y side) is located radially inside the resolver rotor 51.

The connection portion 71c enlarges in the radial direction and connects the end portion of the large diameter portion 71a on the second axial side (+Y side) to the end portion of the small diameter portion 71b on the first axial side (−Y side). In the present embodiment, the connection portion 71c extends toward the second axial side from its radially outer side to its radially inner side. The connection portion 71c has a connection surface 71f facing the first axial side. The connection surface 71f is in an annular shape about the central axis J. The connection surface 71f connects the inner peripheral surface of the large diameter portion 71a to the inner peripheral surface of the small diameter portion 71b. More specifically, the connection surface 71f connects an end portion of an inner peripheral surface of the inserted portion 71d on the second axial side to an end portion of the inner peripheral surface of the small diameter portion 71b on the first axial side. The connection surface 71f extends toward the second axial side from the inner peripheral surface of the large diameter portion 71a toward the inner peripheral surface of the small diameter portion 71b. The connection surface 71f is a tapered surface with an inner diameter decreasing linearly toward the second axial side. The connection surface 71f has an inclination with respect to the axial direction that is larger than an inclination of the inner peripheral surface of the enlarged diameter portion 71e with respect to the axial direction.

The flange portion 72 protrudes radially outward from the feeding tubular part 71. In the present embodiment, the flange portion 12 protrudes radially outward from the feeding tubular part 71 on the first axial side (−Y side). The flange portion 72 is in an annular shape surrounding the central axis J. In the present embodiment, the flange portion 72 is in an annular shape about the central axis J.

The flange portion 72 is located between the current shunter 80 and the bottom wall 23a in the axial direction. This allows the current shunter 80 to be located between the bearing 35 and the flange portion 72 in the axial direction. The flange portion 72 is disposed facing the bottom wall 23a on the second axial side (+Y side). The flange portion 72 is disposed facing the current shunter 80 on the first axial side. The flange portion 72 includes an annular portion 72a and a tubular portion 72b.

The annular portion 72a protrudes radially outward from the feeding tubular part 71. In the present embodiment, the annular portion 72a protrudes radially outward from the end portion of the enlarged diameter portion 71e on the first axial side (−Y side). The annular portion 72a is in an annular shape about the central axis J. The annular portion 72a is in a plate shape in which a plate surface faces the axial direction. The annular portion 72a includes an inner annular portion 72c and an outer annular portion 12d.

The inner annular portion 72c is a radially inner portion of the annular portion 72a. The inner annular portion 72c has a radially inner edge connected to the end portion of the enlarged diameter portion 71e on the first axial side (−Y side). The inner annular portion 72c has a radially outer edge located radially outside the outer peripheral surface of the second shaft portion 31b. The inner annular portion 72c has a surface on the first axial side that is a flat surface 72e constituting a part of a surface of the flange portion 72 on the first axial side. The flat surface 72e is orthogonal to the axial direction. As illustrated in FIG. 3, the flat surface 72e is in an annular shape about the central axis J.

The outer annular portion 72d is a radially outer portion of the annular portion 72a. The outer annular portion 72d is connected to the inner annular portion 72c on a radially outer side. The outer annular portion 72d extends toward the second axial side (+Y side) from a radially outer edge of the inner annular portion 72c toward the radially outer side. The outer annular portion 72d has a surface on the first axial side (−Y side) that is an inclined surface 72f constituting a part of the surface of the flange portion 12 on the first axial side. That is, the surface of the flange portion 72 on the first axial side includes the inclined surface 72f. In the present embodiment, the surface of the flange portion 72 on the first axial side is composed of the flat surface 72e and the inclined surface 72f. The inclined surface 72f extends radially outward toward the second axial side. The inclined surface 72f is in an annular shape about the central axis J. The inclined surface 72f is a tapered surface with an outer diameter decreasing linearly toward the first axial side.

As illustrated in FIG. 2, the tubular portion 72b protrudes from a radially outer edge of the annular portion 72a toward the second axial side (+Y side). The tubular portion 72b is in a cylindrical shape about the central axis J. The tubular portion 72b is fitted radially inside the first wall portion 23c in a clearance fit. This allows the flange portion 72 to be fitted inside the peripheral wall portion 23b in the present embodiment. Thus, the nozzle member 70 can be positioned in the radial direction with respect to the motor housing 20. The tubular portion 72b protruding in the axial direction from the radially outer edge of the annular portion 72a is provided in the present embodiment, so that the nozzle member 70 can be suitably positioned in the radial direction with respect to the motor housing 20 by fitting the tubular portion 72b inside the peripheral wall 23b.

The tubular portion 12b has an end portion on the second axial side that is located on the second axial side from the open end portion 31d. The end portion of the tubular portion 72b on the second axial side surrounds the open end portion 31d. That is, the open end portion 31d is located radially inside the tubular portion 72b in the present embodiment. The tubular portion 72b is disposed facing the current shunter 80 in the axial direction. In the example of FIG. 2, the end portion of the tubular portion 72b on the second axial side is in contact with the surface of the base 81 on the first axial side (−Y side).

The flange portion 72 has an axial dimension L1 that is smaller than an axial dimension L2 between the bottom wall 23a and the current shunter 80. Thus, the flange portion 72 is disposed axially away from at least one of the bottom wall 23a and the current shunter 80. In the example of FIG. 2, the flange portion 72 is disposed on the second axial side (+Y side) away from the bottom wall 23a and is in contact with the current shunter 80. In the present embodiment, the nozzle member 70 is axially movable within a range in which the flange portion 72 is axially movable between the bottom wall 23*a* and the current shunter 80. The axial dimension L1 of the flange portion 72 is an axial distance between the flat surface 72*e* and the end portion of tubular portion 72*b* on the second axial side. The axial distance L2 between the bottom wall 23*a* and the current shunter 80 is an axial distance between a surface of the bottom wall 23*a* on the second axial side and the surface of the base 81 on the first axial side (−Y side). In the present embodiment, the axial distance L2 between the bottom wall 23*a* and the current shunter 80 is equal to an axial dimension of the first wall portion 23*c*.

In the present embodiment, a gap G is provided between the flange portion 72 and the bottom wall 23*a* in the axial direction. The gap G includes a gap G1 between the flat surface 72*e* and the surface of the bottom wall 23*a* on the second axial side (+Y side), and a gap G2 between the inclined surface 72*f* and the surface of the bottom wall 23*a* on the second axial side. The gap G2 is larger than the gap G1. When the nozzle member 70 moves toward the first axial side (−Y side) from the position illustrated in FIG. 2 and the flat surface 72*e* comes into contact with the surface of the bottom wall 23*a* on the second axial side, only the gap G2 is provided between the flange portion 72 and the bottom wall 23*a* in the axial direction. As described above, providing the inclined surface 72*f* enables the gap G2 to be provided between the flange portion 72 and the bottom wall 23*a* in the axial direction even when the flange portion 72 is in contact with the bottom wall 23*a*.

In the present embodiment, the flange portion 72 has at least one feed hole 73 for feeding the oil O as a fluid to the bearing 35. Thus, the oil O as a lubricant can be fed to the bearing 35 through the feed hole 73. In the present embodiment, the feed hole 73 passes through the flange portion 72 in the axial direction. In the present embodiment, the feed hole 73 is provided in the outer annular portion 72*d*. The feed hole 73 opens in the inclined surface 72*f*. The feed hole 73 opens in the gap G between the flange portion 72 and the bottom wall portion 23*a*. More specifically, the feed hole 73 opens in the gap G2 between the inclined surface 72*f* and the surface of the bottom wall portion 23*a* on the second axial side (+Y side). The feed hole 73 opens between the current shunter 80 and the flange portion 72. As illustrated in FIGS. 3 and 4, the feed hole 73 in the present embodiment is a circular hole. Multiple feed holes 73 are provided at intervals in the circumferential direction. The multiple feed holes 73 are disposed at equal intervals along the circumferential direction. For example, four feed holes 13 are provided.

As illustrated in FIG. 1, the drive device 100 in the present embodiment is provided with the refrigerant flow path 90 through which the oil O as a refrigerant circulates. The refrigerant flow path 90 is provided throughout from the inside of the motor housing 20 to the inside of the gear housing 61. The refrigerant flow path 90 allows the oil O stored in the gear housing 61 to be fed to the rotary electric machine 10 and to return to the inside of the gear housing 61 again. The refrigerant flow path 90 is provided with a pump 96, a cooler 97, and the refrigerant feed part 95. In the following description, an upstream side in a flow direction of the oil O in the refrigerant flow path 90 is simply referred to as an "upstream side", and a downstream side in the flow direction of the oil O in the refrigerant flow path 90 is simply referred to as a "downstream side". The refrigerant flow path 90 includes a gear-side flow path portion 91, a connection flow path portion 92, and a rotary-electric-machine-side flow path portion 93.

The gear-side flow path portion 91 includes a first portion 91*a* and a second portion 91*b*. The first portion 91*a* and the second portion 91*b* are provided, for example, in a wall portion of the gear housing 61. The first portion 91*a* allows a portion with the oil O stored, inside the gear housing 61, to communicate with the pump 96. The second portion 91*b* allows the pump 96 to communicate with the cooler 97.

The connection flow path portion 92 is provided from in a wall portion of the gear housing 61 to in a wall portion of the motor housing 20. The connection flow path portion 92 allows the gear-side flow path portion 91 to communicate with the rotary-electric-machine-side flow path portion 93. More specifically, the connection flow path portion 92 allows the cooler 97 to communicate with a third flow path portion 93*c* described later.

The rotary-electric-machine-side flow path portion 93 is provided in the rotary electric machine 10. The rotary-electric-machine-side flow path portion 93 includes a first flow path portion 93*a*, a second flow path portion 93*b*, and a third flow path portion 93*c*. That is, the rotary electric machine 10 includes the first flow path portion 93*a*, the second flow path portion 93*b*, and the third flow path portion 93*c*. The first flow path portion 93*a* and the third flow path portion 93*c* are each provided in a wall portion of the motor housing 20. The second flow path portion 93*b* includes a housing flow path portion 93*d* provided in a wall portion of the motor housing 20, and the refrigerant feed part 95. In the present embodiment, the first flow path portion 93*a*, the third flow path portion 93*c*, and the housing flow path portion 93*d* are provided in the lid 23. The third flow path portion 93*c* communicates with the first flow path portion 93*a* and the second flow path portion 93*b*. In the present embodiment, the first flow path portion 93*a* and the second flow path portion 93*b* branch from the third flow path portion 93*c*.

The first flow path portion 93*a* allows the oil O as a fluid to be fed into inside the peripheral wall 23*b*. The first flow path 93*a* has an end portion on the upstream side that communicates with an end portion of the third flow path 93*c* on the downstream side. The first flow path portion 93*a* has an end portion on the downstream side that opens to the inside of the peripheral wall 23*b*. Although not illustrated, the end portion of the first flow path portion 93*a* on the downstream side opens, for example, in an end portion of the inner peripheral surface of the peripheral wall 23*b* on the first axial side (−Y side).

The second flow path portion 93*b* allows the oil O as a fluid to be fed to the stator 40. The second flow path 93*b* has an end portion upstream from the housing flow path 93*d*, the end portion communicating with an end portion of the third flow path 93*c* on the downstream side. The housing flow path portion 93*d* has an end portion on the downstream side that communicates with an end portion of the refrigerant feed part 95 on the upstream side.

In the present embodiment, the refrigerant feed part 95 is in a tubular shape extending in the axial direction. In other words, the refrigerant feed part 95 is a pipe extending in the axial direction in the present embodiment. The refrigerant feed part 95 has axially opposite end portions supported by the motor housing 20. The refrigerant feed part 95 has the end portion on the second axial side (+Y side) that is supported by, for example, the partition wall 22. The refrigerant feed part 95 has the end portion on the first axial side (−Y side) that is supported by, for example, the lid 23.

The refrigerant feed part 95 is located radially outside the stator 40. In the present embodiment, the refrigerant feed part 95 is located above the stator 40. In the present embodiment, the oil O in the refrigerant feed part 95 flows in a direction from the first axial side toward the second axial side. That is, the oil O in the refrigerant feed part 95 flows in the direction in which the first axial side is an upstream side and the second axial side is a downstream side. The refrigerant feed part 95 has a feed port 95a for feeding the oil O as a refrigerant to the stator 40. In the present embodiment, the feed port 95a is an injection port that injects partially the oil O having flowed into the refrigerant feed part 95 to the outside of the refrigerant feed part 95. Multiple feed ports 95a are provided.

When the pump 96 is driven, the oil O stored in the gear housing 61 is sucked up through the first portion 91a and flows into the cooler 97 through the second portion 91b. The oil O having flowed into the cooler 97 is cooled in the cooler 97, and then flows through the connection flow path portion 92 and flows into the rotary-electric-machine-side flow path portion 93 from the third flow path portion 93c. The oil O having flowed into the third flow path portion 93c branches into the first flow path portion 93a and the second flow path portion 93b. The oil O having flowed into the first flow path portion 93a flows into inside the peripheral wall 23b. In the present embodiment, the oil O from the first flow path portion 93a flows into the gap G between the flange portion 72 and the bottom wall 23a in the axial direction. More specifically, the oil O from the first flow path portion 93a flows into the gap G2 between the inclined surface 72f and the bottom wall 23a.

As illustrated in FIG. 2, the oil O having flowed into inside the peripheral wall 23b partially passes through the inside of the feeding tubular part 71 of the nozzle member 70 and flows into inside the shaft 31. As described above, providing the first flow path portion 93a enables the oil O to be fed from the inside of the peripheral wall 23b into the shaft 31 in the present embodiment. In the present embodiment, the oil O having flowed into the gap G2 flows into the feeding tubular part 11 from the end portion of feeding tubular part 71 on the first axial side (−Y side) through the gap G1. Here, the axial dimension L1 of the flange portion 72 is smaller than the axial distance L2 between the bottom wall 23a and the current shunter 80 in the present embodiment, so that the gap G1 can be suitably generated. As a result, even when the oil O is fed from the first flow path portion 93a to the gap G2 as in the present embodiment, the oil O can be easily fed into the feeding tubular part 71 through the gap G1. In the present embodiment, the inner diameter of the end portion of the feeding tubular part 71 on the first axial side in the present embodiment increases toward the first axial side. This enables the oil O to easily flow into the feeding tubular part 71 from the end portion of the feeding tubular part 71 on the first axial side. As a result, the oil O can be more easily fed into the feeding tubular part 71.

As illustrated in FIG. 1, the oil O having flowed into the shaft 31 from the nozzle member 70 passes through the inside of the rotor body 32 from the hole 33 and scatters to the stator 40. As illustrated in FIG. 2, the oil O having flowed into inside the peripheral wall 23b partially passes through the feed hole 73 from the first axial side (−Y side) toward the second axial side (+Y side) to be fed to the bearing 35.

Here, the feed hole 73 opens in the gap G between the flange portion 72 and the bottom wall portion 23a in the present embodiment. Thus, the oil O having flowed into the gap G can easily pass through the feed hole 73. This enables the oil O to be easily fed to the bearing 35 through the feed hole 73. In the present embodiment, the feed hole 73 opens in the inclined surface 72f. This enables the oil O to easily flow into the feed hole 73 through the gap G2 between the inclined surface 72f and the bottom wall 23a in the axial direction even when the flange portion 72 is in contact with the bottom wall 23a. Thus, the oil O can be more easily fed to the bearing 35 through the feed hole 73.

The oil O to be fed to the bearing 35 passes through the feed hole 73 and then passes through a radial gap between the current shunter 80 and the shaft 31, for example, to reach the bearing 35. The oil O having flowed into the peripheral wall 23b may partially flow into the shaft 31 through a radial gap between the shaft 31 and the feeding tubular part 71 after passing through the feed hole 73 from the first axial side toward the second axial side.

As illustrated in FIG. 1, the oil O having flowed into the second flow path portion 93b flows into the inside of the refrigerant feed part 95 through the housing flow path portion 93d. The oil O having flowed into the refrigerant feed part 95 is injected from the feed port 95a and fed to the stator 40. As described above, providing the first flow path portion 93a and the second flow path portion 93b, which branch from the third flow path portion 93c, enables the oil O fed from the inside of the gear housing 61 to be suitably and easily fed into the shaft 31 through the inside of the peripheral wall 23b and to be fed to the stator 40 from the refrigerant feed part 95.

In the present embodiment, the oil O scooped up by the ring gear 63a partially enters a reservoir 98 provided in the gear housing 61. The oil O having entered the reservoir 98 flows into the shaft 31 from its end portion on the second axial side (+Y side). The oil O having flowed into the shaft 31 from the reservoir 98 passes through the inside of the rotor body 32 from the hole 33 and scatters to the stator 40.

The oil O fed to the stator 40 from the feed port 95a and the oil O fed to the stator 40 from the inside of the shaft 31 take heat from the stator 40. The oil O having cooled the stator 40 falls downward to accumulate in a lower region in the motor housing 20. The oil O accumulated in the lower region in the motor housing 20 returns to the inside of the gear housing 61 through the partition wall opening 22a provided in the partition wall 22. As described above, the refrigerant flow path 90 allows the oil O stored in the gear housing 61 to be fed to the rotor 30 and the stator 40.

According to the present embodiment, the flange portion 72 is located between the current shunter 80 fixed to the motor housing 20 and the bottom wall 23a in the axial direction. Thus, the flange portion 72 can be pressed by the bottom wall 23a from the first axial side, and the flange portion 72 can be pressed by the current shunter 80 from the second axial side. That is, the current shunter 80 can prevent the nozzle member 70 from moving in the axial direction with respect to the motor housing 20. This enables the nozzle member 70 to be attached to the motor housing 20 by fixing the current shunter 80 to the motor housing 20. Thus, a fixing member for fixing the nozzle member 70 to the motor housing 20 is not required in addition to the current shunter 80, so that the number of parts of the rotary electric machine 10 can be reduced. As a result, the number of parts of the drive device 100 can be reduced. The number of parts of the rotary electric machine 10 and the number of parts of the drive device 100 can be reduced, so that man-hours and time required for assembling the rotary electric machine 10 and the drive device 100 can be reduced.

According to the present embodiment, the current shunter 80 is located between the bearing 35 and the flange portion 72 in the axial direction. Thus, even when the current shunter 80 comes off from the motor housing 20, the bearing 35 can prevent the current shunter 80 from moving toward the second axial side. As a result, even when the current shunter 80 comes off from the motor housing 20, the current shunter 80 can prevent the flange portion 72 from moving toward the second axial side.

According to the present embodiment, the bearing 35 is located between the resolver rotor 51 and the current shunter 80 in the axial direction. Thus, the bearing 35 can be disposed at a position closer to the current shunter 80 than when the resolver rotor 51 is provided between the bearing 35 and the current shunter 80 in the axial direction. This enables the oil O to easily reach the bearing 35 from the feed hole 73 in a structure in which the oil O is fed to the bearing 35 from the feed hole 73 of the nozzle member 10 as in the present embodiment.

According to the present embodiment, the open end portion 31d is located on the first axial side (−Y side) from the current shunter 80 and located radially inside the tubular portion 72b. This enables preventing the entire rotary electric machine 10 from increasing in size in the axial direction by extending the shaft 31 toward the first axial side from the current shunter 80 to allow the current shunter 80 to easily come into contact with the shaft 31, and disposing a portion of the shaft 31, which is extended toward the first axial side from the current shunter 80, in the tubular portion 72b.

According to the present embodiment, the feeding tubular part 71 includes the large diameter portion 71a and the small diameter portion 71b that is connected to the large diameter portion 71a on the second axial side (+Y side) and that has a smaller inner diameter than the large diameter portion 71a. When the feeding tubular part 71 is provided with the small diameter portion 71b to allow a part of the feeding tubular part 71 to be reduced in diameter as described above, the oil O can be prevented from flowing excessively from the feeding tubular part 71 into the shaft 31. This enables the oil O having flowed into the peripheral wall 23b to be partially and easily fed to the bearing 35 from the feed hole 73. This also enables preventing an excessive increase in the total amount of the oil O flowing from the first flow path portion 93a into the peripheral wall 23b. Thus, an excessive increase in the amount of the oil O branching from the third flow path portion 93c to the first flow path portion 93a can be prevented, so that a decrease in the amount of the oil O branching from the third flow path portion 93c to the second flow path portion 93b can be prevented. This enables the oil O to be suitably fed to the stator 40 from the second flow path portion 93b. Additionally, the oil O can be stored in the large diameter portion 71a, and the oil O stored in the large diameter portion 71a can be sequentially and stably fed into the shaft 31 from the small diameter portion 71b.

According to the present embodiment, the connection portion 71c connecting the end portion of the large diameter portion 71a on the second axial side (+Y side) and the end portion of the small diameter portion 71b on the first axial side (−Y side) has the connection surface 71f that extends toward the second axial side from the inner peripheral surface of the large diameter portion 71a toward the inner peripheral surface of the small diameter portion 71b. This enables the oil O having flowed into the large diameter portion 71a to easily flow into the small diameter portion 71b along the connection surface 71f. As a result, the oil O can be easily fed into the shaft 31 from the small diameter portion 71b.

Figure 5:
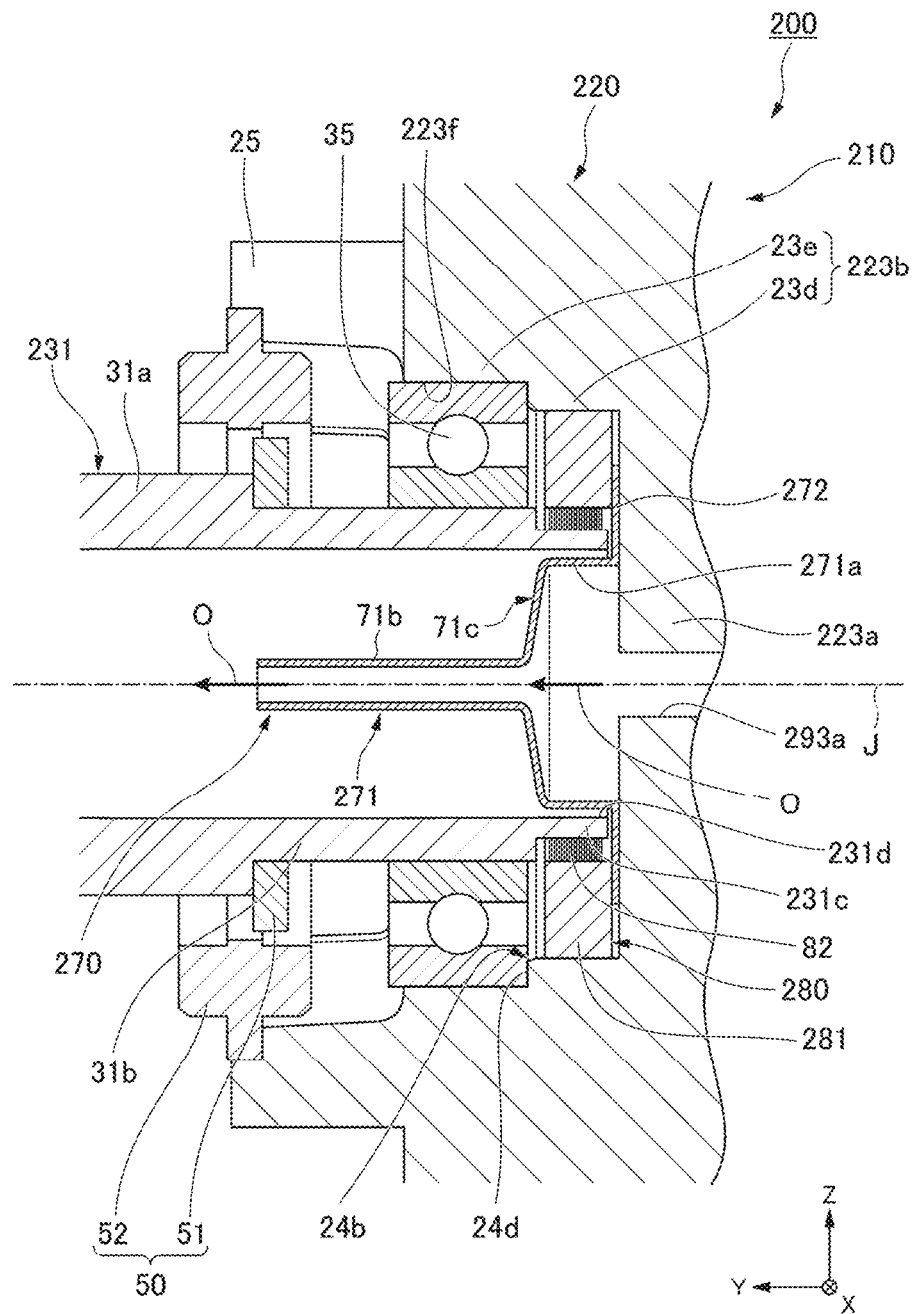
FIG. 5 is a sectional view illustrating a part of a rotary electric machine of a second embodiment.

As illustrated in FIG. 5, a rotary electric machine 210 of a drive device 200 of the present embodiment includes a first flow path portion 293a that opens in a radial central portion of a bottom wall 223a. Unlike the first embodiment, a peripheral wall 223b is not provided with a first wall portion 23c. In the present embodiment, a second wall portion 23d is connected to the bottom wall 223a.

A nozzle member 270 includes a feeding tubular part 271 in which a large diameter portion 271a has an inner diameter and an outer diameter that are each uniform throughout the axial direction. A flange portion 272 protrudes radially outward from an end portion of the large diameter portion 271a on the first axial side (−Y side). In the present embodiment, the flange portion 272 is in a plate shape having a flat plate surface orthogonal to the axial direction. Unlike the flange portion 72 of the first embodiment, the flange portion 272 does not have a tubular portion 72b. The flange portion 272 has a surface on the first axial side that is in contact with a surface of the bottom wall 223a on the second axial side (+Y side).

A current shunter 280 includes a base 281 that has a surface on the first axial side (−Y side), the surface being in contact with a surface of the flange portion 272 on the second axial side (+Y side). This allows the flange portion 272 to be in contact with both the bottom wall 223a and the current shunter 280 in the axial direction. Thus, the current shunter 280 can more suitably suppress movement of the nozzle member 270 toward the second axial side. As described above, the current shunter 280 enables the nozzle member 270 to be more stably attached to a motor housing 220 in the present embodiment. Additionally, the nozzle member 270 can be prevented from rattling in the axial direction. Thus, a noise can be prevented from being generated by the rotary electric machine 210.

In the present embodiment, the current shunter 280 comes into contact with the surface of the flange portion 2/2 on the second axial side to be positioned axially with respect to the motor housing 220. Unlike the first embodiment, no gap is provided between the flange portion 272 and the bottom wall 223a in the axial direction. Unlike the flange portion 72 of the first embodiment, the flange portion 272 does not have a feed hole 73. The flange portion 272 has a radially outer edge that is away from an inner peripheral surface of the peripheral wall 223b in the radially inward direction.

In the present embodiment, an open end portion 231d of a third shaft portion 231c of a shaft 231 is located on the second axial side (+Y side) from an end portion of the current shunter 280 on the first axial side (−Y side). The open end portion 231d is disposed facing the flange portion 272 on the second axial side across a gap. Other configurations of the rotary electric machine 210 can be made similarly to other configurations of the rotary electric machine 10 of the first embodiment. Other configurations of the drive device 200 can be made similarly to other configurations of the drive device 100 of the first embodiment.

The present invention is not limited to the above-described embodiment, and other structures and other methods may be employed within the scope of the technical idea of the present invention. The current shunter may be any type of current shunter as long as it is in electrical contact with a shaft and a housing of a rotary electric machine to allow a current flowing through the shaft to flow to the housing.

The nozzle member may have any shape as long as it has a feeding tubular part and a flange portion. The nozzle member may include a tubular portion protruding toward the first axial side from a radially outer edge of an annular portion. The feeding tubular part may have an inner diameter that is uniform throughout the axial direction. The feeding tubular part may have an outer peripheral surface that is in contact with an inner peripheral surface of the shaft. Any kind of fluid may be used as the fluid fed into inside the shaft from the nozzle member. The fluid may be an insulating liquid or water. When the fluid is water, the surface of the stator may be subjected to an insulation treatment. The structure and method in which the fluid is fed into the peripheral wall are not particularly limited. Placement of the resolver and the bearing is not particularly limited.

The rotary electric machine to which the present invention is applied is not limited to a motor, and may be a generator. The rotary electric machine is not limited in application. For example, the rotary electric machine may be mounted on a vehicle for uses other than rotating an axle, or may be mounted on an apparatus other than the vehicle. The rotary electric machine is not particularly limited in attitude when being used. The rotary electric machine may have the central axis extending in the vertical direction. The structures and methods described above in the present specification can be appropriately combined within a range consistent with each other.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A rotary electric machine comprising:
a rotor having a shaft in a hollow shape rotatable about a central axis;
a stator facing the rotor across a gap;
a housing for accommodating the rotor and the stator inside;
a bearing that rotatably supports the rotor;
a current shunter that is fixed to the housing and is in electrical contact with the shaft and the housing; and
a nozzle member that feeds fluid into inside the shaft,
the shaft including an open end portion that opens on a first axial side,
the housing including:
a bottom wall located on the first axial side from the open end portion; and
a peripheral wall protruding from the bottom wall toward a second axial side and surrounding the open end portion,
the nozzle member including:
a feeding tubular part that is at least partly inserted into inside the shaft from the open end portion; and
a flange portion that protrudes radially outward from the feeding tubular part,
the current shunter being located radially inside the peripheral wall, and
the flange portion being located between the current shunter and the bottom wall in an axial direction.

2. The rotary electric machine according to claim 1, wherein
the peripheral wall includes an inner peripheral surface provided with a first stepped portion with a first shoulder surface facing the second axial side, and
the current shunter is in contact with the first shoulder surface.

3. The rotary electric machine according to claim 1, wherein
the current shunter is located between the bearing and the flange portion in the axial direction.

4. The rotary electric machine according to claim 3, further comprising:
a resolver capable of detecting rotation of the rotor, wherein
the resolver includes:
a resolver rotor fixed to the shaft; and
a resolver stator located radially outside the resolver rotor, and
the bearing is located between the resolver rotor and the current shunter in the axial direction.

5. The rotary electric machine according to claim 3, wherein
the inner peripheral surface of the peripheral wall is provided with a second stepped portion with a second shoulder surface facing the second axial side, and
the bearing is in contact with the second shoulder surface.

6. The rotary electric machine according to claim 1, wherein
the flange portion includes at least one feed hole for feeding the fluid to the bearing.

7. The rotary electric machine according to claim 6, wherein
a gap is provided between the flange portion and the bottom wall in the axial direction, and
the feed hole opens in the gap.

8. The rotary electric machine according to claim 6, wherein
the flange portion includes a surface on the first axial side, the surface being provided with an inclined surface extending radially outward toward the second axial side, and
the feed hole opens in the inclined surface.

9. The rotary electric machine according to claim 1, wherein
the flange portion is fitted inside the peripheral wall.

10. The rotary electric machine according to claim 1, wherein
the flange portion includes:
an annular portion protruding radially outward from the feeding tubular part; and
a tubular portion protruding in the axial direction from a radially outer edge of the annular portion.

11. The rotary electric machine according to claim 10, wherein
the tubular portion protrudes from the radially outer edge of the annular portion toward the second axial side, and is disposed facing the current shunter in the axial direction, and
the open end portion is located on the first axial side from the current shunter and located radially inside the tubular portion.

12. The rotary electric machine according to claim 1, wherein
the feeding tubular part includes:
a large diameter portion; and
a small diameter portion that is connected to the large diameter portion on the second axial side and has a smaller inner diameter than the large diameter portion.

13. The rotary electric machine according to claim 12, wherein
the feeding tubular part includes a connection portion that extends radially to connect an end portion of the large diameter portion on the second axial side and an end portion of the small diameter portion on the first axial side,
the connection portion includes a connection surface that faces the first axial side and that connects an inner peripheral surface of the large diameter portion and an inner peripheral surface of the small diameter portion, and the connection surface extends toward the second axial side from the inner peripheral surface of the large diameter portion toward the inner peripheral surface of the small diameter portion.

14. The rotary electric machine according to claim 1, wherein
the feeding tubular part includes an outer peripheral surface disposed away from an inner peripheral surface of the shaft in a radially inward direction.

15. The rotary electric machine according to claim 1, wherein
an inner diameter of an end portion of the feeding tubular part on the first axial side increases toward the first axial side.

16. The rotary electric machine according to claim 1, wherein
the flange portion has a dimension in the axial direction, the dimension being smaller than a distance between the bottom wall and the current shunter in the axial direction.

17. The rotary electric machine according to claim 1, wherein
the flange portion is in contact with both the bottom wall and the current shunter in the axial direction.

18. The rotary electric machine according to claim 1, further comprising:
a first flow path portion for feeding the fluid into inside the peripheral wall.

19. The rotary electric machine according to claim 18, further comprising:
a second flow path portion for feeding the fluid to the stator; and
a third flow path portion to which the first flow path portion and the second flow path portion are connected, wherein
the first flow path portion and the second flow path portion branch from the third flow path portion.

20. A drive device mounted on a vehicle, the drive device comprising:
the rotary electric machine according to claim 1; and
a transmission device connected to the rotary electric machine to transmit rotation of the rotary electric machine to an axle of the vehicle.

* * * * *